United States Patent
Yoshizawa et al.

(10) Patent No.: US 6,189,414 B1
(45) Date of Patent: Feb. 20, 2001

(54) COUNTER PLATE AND CUTTING DIE FOR DIE CUTTING MACHINE

(75) Inventors: Akinori Yoshizawa, Nagaoka; Isamu Katayama, Shinjuku-Ku; Shigeru Nagasawa, Santo-Gun, all of (JP)

(73) Assignees: Yoshizawa Industry Inc., Niigata; Katayama Steel Rule Die, Inc., Tokyo, both of (JP)

( * ) Notice: Under 35 U.S.C. 154(b), the term of this patent shall be extended for 0 days.

(21) Appl. No.: 09/130,832

(22) Filed: Aug. 7, 1998

Related U.S. Application Data

(63) Continuation-in-part of application No. 08/711,523, filed on Sep. 10, 1996, now abandoned.

(30) Foreign Application Priority Data

Dec. 19, 1995 (JP) .................................................. 7-330857
Jan. 10, 1996 (JP) .......................................................... 8-2145

(51) Int. Cl.[7] ................................................. B21K 5/20
(52) U.S. Cl. ................................................. 76/4; 76/107.8
(58) Field of Search .............................. 83/658, 856, 678, 83/686; 76/4, 107.8

(56) References Cited

U.S. PATENT DOCUMENTS

| | | | | |
|---|---|---|---|---|
| 4,304,978 | * | 12/1981 | Saunders | 219/121 L |
| 4,377,735 | * | 3/1983 | Minamida et al. | 219/121 LM |
| 4,608,895 | * | 9/1986 | Bell et al. | 83/345 |
| 4,829,647 | * | 5/1989 | Anderson et al. | 29/156.4 R |
| 5,208,434 | * | 5/1993 | Minamida et al. | 219/121.6 |
| 5,211,084 | | 5/1993 | Holliday et al. . | |
| 5,370,028 | | 12/1994 | Grebe . | |
| 5,417,132 | * | 5/1995 | Cox et al. | 83/116 |
| 5,500,290 | * | 3/1996 | Udagawa et al. | 428/610 |
| 5,512,114 | * | 4/1996 | Short et al. | 148/565 |
| 5,736,709 | * | 4/1998 | Neiheisel | 219/121.61 |
| 5,879,480 | * | 3/1999 | Hetzner | 148/644 |

FOREIGN PATENT DOCUMENTS

| | | |
|---|---|---|
| 0276461 | 8/1988 | (EP) . |
| 0327530 | 8/1989 | (EP) . |
| 2180504 | 4/1987 | (GB) . |
| WO9101386 | 2/1991 | (WO) . |

OTHER PUBLICATIONS

Kobe Steel,Ltd. Patent Abstracts of Japan, JP 62 116717A Aug. 25, 1987 vol. 11, No. 332 (C–455), Oct. 29, 1987.
Kobe Steel,Ltd. Patent Abstracts of Japan, JP 62 116717A Aug. 25, 1987 vol. 11, No. 332 (C–455), Oct. 29, 1987.
Takefu Tokushu Kozai Patent Abstracts of Japan, JP 61 202734A Sep. 8, 1986 vol. 11, No. 34 (M–558), Jan. 31, 1987.

* cited by examiner

*Primary Examiner*—M. Rachuba
(74) *Attorney, Agent, or Firm*—Huntley & Associates

(57) ABSTRACT

A counter plate is provided as a receiving surface opposed to a cutting die to be installed in a die cutting machine for stamping a sheet material into a predetermined shape and making ruled lines thereon, wherein the cutting die has rulings and cutting blades and the counter plate has edge bearing portions formed on portions corresponding to the cutting blades and hollows corresponding to the rulings, and a process for manufacturing the cutting die and counter plate comprising hardening selected portions thereof using laser beam irradiation.

7 Claims, 4 Drawing Sheets

COUNTER PLATE AND CUTTING DIE FOR DIE CUTTING MACHINE

CROSS-REFERENCE TO RELATED APPLICATION

This Application is a Continuation-in-Part of application U.S. Ser. No. 08/711,523 filed on Sep. 10, 1996 abandoned.

BACKGROUND OF THE INVENTION

The present invention relates to a counter plate and a cutting die for use in a die cutting machine, where the counter plate is a receiving surface for cutting blades of the machine while the cutting die is provided for stamping a sheet-shaped material into a predetermined shape.

Heretofore, die cutting machines have been used for stamping a sheet shaped material such as a synthetic resin film, a thin sheet of paper, and a sheet of carton board into a stamped piece thereof having a predetermined shape. The conventional die cutting machine comprises a cutting die and a female die, by which a sheet shaped material is stamped into a predetermined shape by pressing the cutting die against the material placed on the female die.

Conventional die cutting machines typically comprise a cutting die having cutting blades and rulings, and a counter plate or female die. Typically, the counter plate is made of a veneer plate or a metal plate, on which grooves are formed by means of a laser machining, the grooves being adapted to permit insertion of the blades and rulings. Both the cutting blades and the rulings are typically formed by bending a strip of plate material and inserting it into the grooves formed on the base plate. The counter plate or receiving plate is arranged opposite the cutting die in the die cutting machine. The counter plate is usually made of a metal plate with a thickness of about 1.5 mm. The counter plate is a flat receiving surface, except portions formed as hollows corresponding to the rulings.

The die cutting machine so constructed is able to stamp a sheet of material such as a synthetic resin film, a thin sheet of paper, and a sheet of box board into a desired shape by pressing the cutting blades against the receiving surface of the counter plate by pulling down the cutting die (i.e., from its resting position) after placing the sheet material on the counter plate 60.

As the cutting blade comes into repeated contact with the receiving surface, the counter plate described should be made of a material having an extremely high hardness (i.e., around HRC 500), such as a high hardness stainless steel. However, the use of such hard material results in several disadvantages such as the high cost and time of production. Fabrication of the plate using less hard materials results in less durable cutting parts, especially to the counter plate due to the formation of recessed area as a result of repeated contact with the cutting blades.

Typically, cutting blades are prepared from a band shaped material having an extremely high hardness (i.e., around HRC 500), so that it takes much time to cut the material into pieces having a predetermined length, and to bend each piece into a predetermined shape to form each cutting blade. Furthermore, spring back can occur at the time of bending the cutting blade, and corrective action is usually required to prevent the spring back. Consequently, the fabrication of the cutting blades is a time consuming process.

SUMMARY OF THE INVENTION

The present invention provides a process for fabrication of a cutting die machine that reduces the amount of labor, reduces the cost of the raw materials, and reduces the process steps required to create the cutting and scoring parts of the die cutting machine, without sacrificing the durability or quality of those parts. The present invention also provides a die cutting machine having more durable and reliable cutting and scoring components, without requiring special materials, or costly modifications.

Specifically, the present invention provides A counter plate to be provided as substantially planar receiving surface opposed to a cutting die and to be installed in a die-cutting machine for stamping a sheet material into a predetermined shape and making ruled lines thereon by using said cutting die on which cutting blades and rulings are securely fixed, said counter plate comprising a plate body having a plurality of hollows formed on portions corresponding to said rulings; wherein said plate body is made of a thin steel plate; and wherein a plurality of edge bearing portions formed on portions corresponding to said cutting blades are hardened by irradiation with a laser beam so that partial melting occurs, and quenched so that solidification occurs.

The invention further provides a cutting die to be installed in a die-cutting machine, comprising a base plate on which thin cutting blades for stamping a sheet material into a predetermined shape and rulings for making ruled lines on said sheet material are fixed, wherein each of said cutting blades has a cutting edge portion hardened by irradiation with a laser beam in such a manner that said cutting blades are fixed on said base plate during irradiation with the laser beam.

The present invention also provides a method for manufacturing a counter plate to be provided as a receiving substantially planar surface opposed to a cutting die and to be installed in a die-cutting machine for stamping a sheet material into a predetermined shape and making ruled lines thereon by using said cutting die on which cutting blades and rulings are securely fixed, said method comprising the steps of: forming hollows on portions of a plate body made of a thin steel corresponding to said rulings; and hardening portions of said plate body in order to form edge-bearing portions corresponding to said cutting blades by irradiation with a laser beam so that partial melting occurs, and quenching so that solidification occurs.

DETAILED DESCRIPTION OF THE INVENTION

The object and advantages of the present invention will become more apparent from the drawings and the following description. Variations and modifications of the embodiments shown and described can be substituted without departing from the principles of the invention, as will be evident to those skilled in the art.

Figure 1:
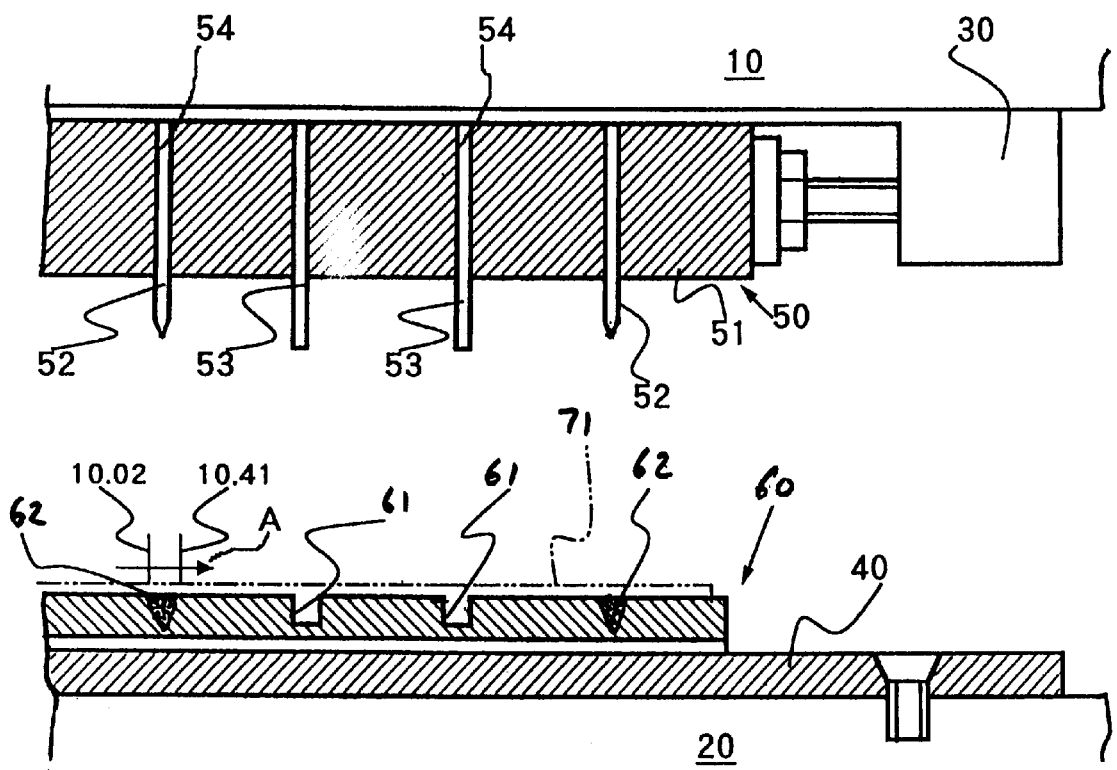
FIG. 1 is a schematic cross sectional view of a die cutting machine of the present invention.

In FIG. 1 there is shown a schematic cross section of the die cutting machine of the present invention. As shown in FIG. 1, a counter plate 60 is fixed on a lower platen 20, while a chase 30 and a cutting die 50 are attached on an upper slider 10. The cutting die 50 is manufactured by fixing a plurality of cutting blades 52 and a plurality of rulings 53 on a base plate 51 made of a veneer plate having a plurality of grooves 54 formed by means of a carbon dioxide laser beam machining. In addition, the cutting blades 52 and the rulings 53 can be formed by bending a thin strip of flexible material and inserting bent portions thereof into the grooves, securing the blade or ruling in the groove of the base plate.

The counter plate 60 includes first portions formed as hollows 61 that correspond to the rulings 53 and second portions formed as edge bearing portions 62 that correspond to the cutting blades 52. The counter plate can be made of an SK material of about 1.5 mm thickness. The hollows and edge bearing portions can be prepared by means of laser beam hardening. In this embodiment, the surface hardness of the counter plate is around Hv 180 prior to hardening.

Figure 2:
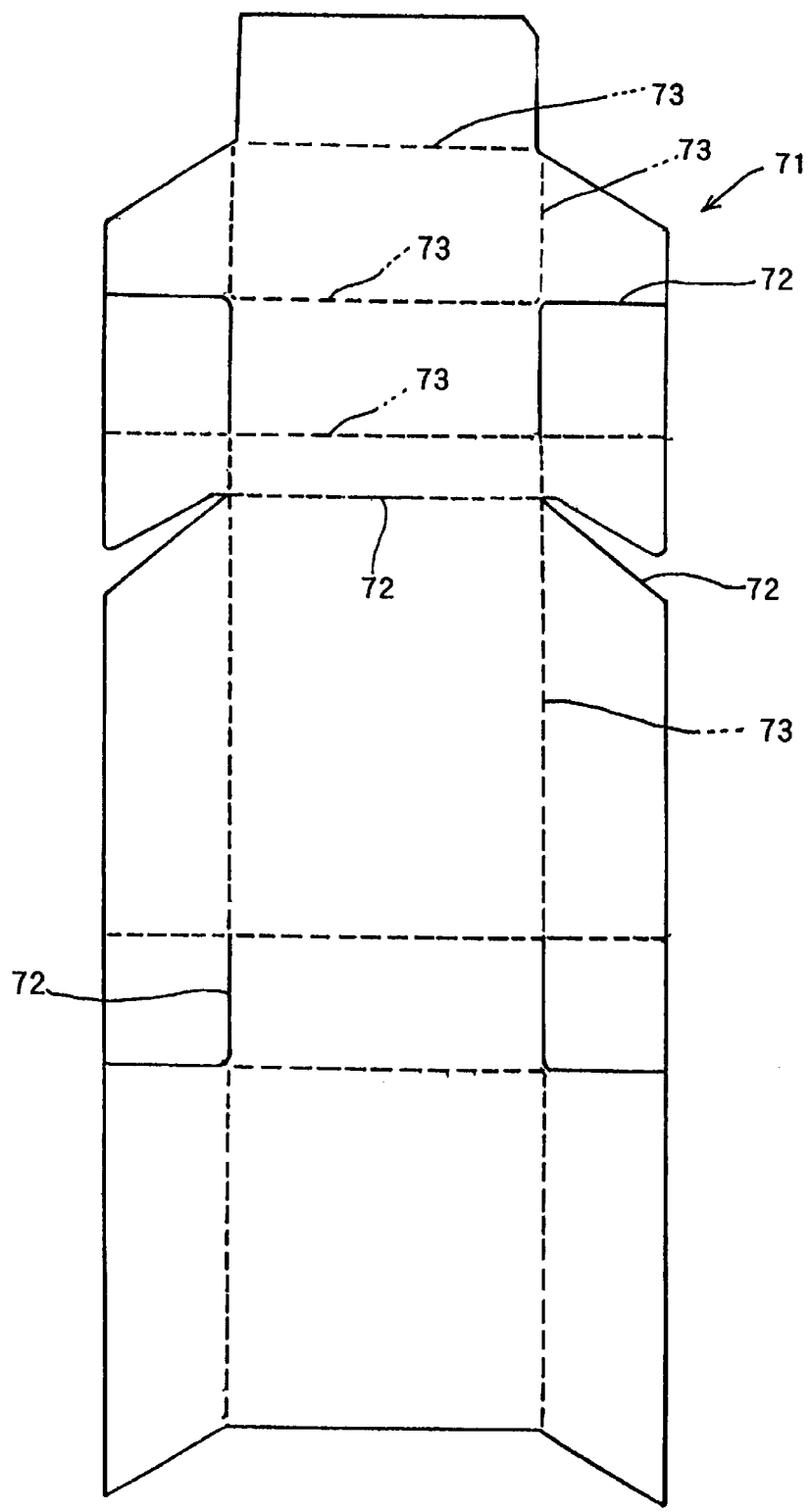
FIG. 2 is a top plan view of a sheet material stamped by the die cutting machine.

In FIG. 2, there is shown an example of a piece of the sheet material that has been stamped by the die cutting machine of the present invention. The stamped sheet 71 is of desired shape and has cut lines 72 and ruled lines 73. The cut lines 72 are formed by contacting a tip of the cutting blades on one side and the counter plate or receiving surface on the other, while the ruled lines are formed by contacting a tip of the rulings on one side and a hollow portion of the counter plate on the other.

To prepare the base plate and counter plate of the die cutting machine of the present invention according to the process of the present invention, a laser beam is applied using a carbon dioxide laser beam machine to harden selected portions. The laser beam hardening process is accomplished under the following conditions: 500 W in output power; 10 inches in total length; and 2,400 mm/min. in processing rate. Accordingly, the hardening process is easily performed with the aid of CAD (computer assisted design) data used in the process of forming grooves 54 of the base plate 51, resulting in easily hardened edge bearing portions 62. In this process, it is noted that there is no need to use additional devices such as cooling devices.

Prior to the above hardening, furthermore, hollows 61 are formed in the counter plate by using a mining cutter. The counter plate 60 is easily processed because a hardness of SK material is comparatively not high. In this case, the process is also easily performed with the aid of CAD data described above. As explained above, the counter plate of the present embodiment is prepared from a steel plate with a comparatively low hardness. The steel plate is easily machined with less expensive, and also a surface thereof is easily subjected to the hollow formation and the hardening process for providing an edge bearing portions, resulting that an extremely low cost counter plate.

Accordingly, the present invention is realized by new concepts including that only an edge bearing portion is subjected to the hardening process using a laser irradiation, so that the following advantages are obtained. It means that the process for manufacturing a counter plate including the step of hardening only a contact portion of a cutting blade of a cutting die can be effectively used to a considerable degree because of the following reasons: (i) the counter plate is designed to keep up with the demands in which the volume of production is relatively low and there are a wide variety of products to be made; (ii) the process uses a thinner material compared with that of the conventional one so that it provides the counter plate cost effectively and improves the plate handling. Consequently, as described above, a cheap counter plate with high durability can be materialized by the process including the steps of using a cheap material to be easily machined and hardening only a portion corresponding to a cutting blade by means of a laser irradiation to easily form a high hardness edge bearing portion.

Figure 3:
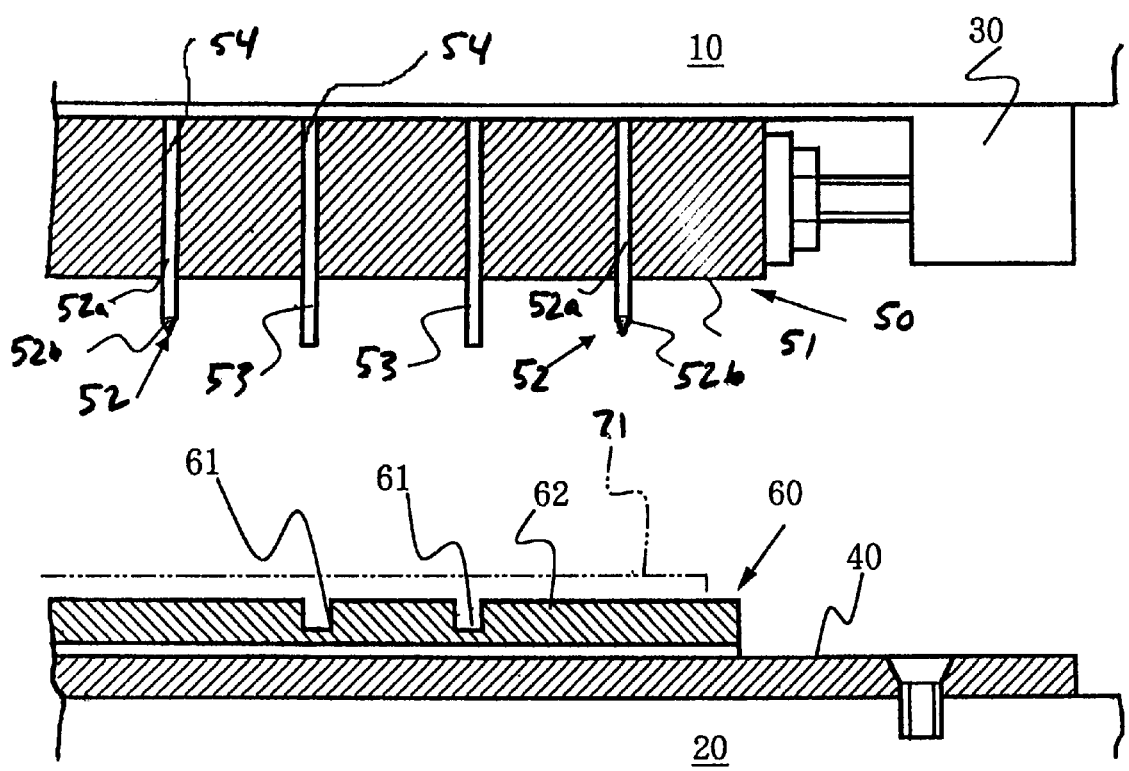
FIG. 3 is a schematic cross sectional view of an alternate embodiment of a die cutting machine of the present invention.

Referring now to FIG. 3, there is shown a schematic cross section of an alternate embodiment of a die cutting machine of the present invention. As shown in FIG. 3, a cutting die 50 comprises cutting blades 52 and rulings 53 which are mounted securely on a base plate 51. The base plate is made of a veneer plate having a plurality of grooves 54 formed by means of carbon dioxide laser beam machining. In the counter plate 60, hollows 61 are formed on appropriate portions corresponding to the rulings 53, and edge bearing portions 62 are formed on in positions corresponding to the cutting blades 52.

Each of the cutting blades 52 is formed as a band shaped SK material of about 0.7 mm in thickness and mainly comprises a base portion 52a and an edge portion 52b. The base portion 52a is not hardened, while the edge portion 52b is hardened by a laser irradiation. The edge portion is formed by the process cutting a band shaped material without hardening into a cutting edge portion; cutting and bending the cutting blade into a predetermined length so as to fit into the groove; inserting the cutting blade into the groove so as to be secured therein; and hardening the top portion thereof by a laser irradiation to obtain the hardened cutting edge portion. In the present embodiment, the surface hardness of the cutting edge portion is around Hv 500, while the surface hardness of the base portion is around Hv 180.

Alternate embodiments of the cutting die can comprise a counter plate made of an SK material of about 1.5 mm thick. The counter plate includes a first portion that corresponds to the rulings, and a second portion that corresponds to the cutting blades. The first portion is formed as hollows, while the second portion are provided as edge bearing portions which are prepared by means of laser beam hardening and annealing. In embodiments of this type, the surface hardness of the edge bearing portion is about from Hv 500 to Hv 600. The surface hardness of the counter plate, excluding the edge bearing portions, is about Hv 180.

In embodiments of the type discussed in the previous paragraph, portions of the cutting die are hardened using a carbon dioxide laser beam machine. To harden the portions, the laser beam machine is set for use under the following parameters: 500 W in output power; 5 inches in focal length; 20 mm beam diameter; and 1,200 mm/minute processing rate. The laser beam partially melts the portion of the die cutting machine to be hardened, so that heat is absorbed evenly from the surface. The portion is then annealed by the same laser beam machine, set to operate under the same parameters as above, with the following exceptions: The focus of the beam is offset forward or away by about 0.2 to 0.4 inches, and the processing rate is 1,200 to 2,000 mm/minute. During the annealing step, the hardness is decreased from about Hv 700–800 to about Hv 500–600, which is lower than the hardness of the cutting edge portion.

Generally, the annealing step is conducted using a laser beam having low average power and a low scanning speed. Reducing the power of the laser beam is performed by adjusting the pulse length of the pulse mode laser or reducing output power of the continuous mode laser, as well as offsetting the focus of the laser beam. The scanning rate is typically determined to present the hardened portion from being melted again.

Figure 4:
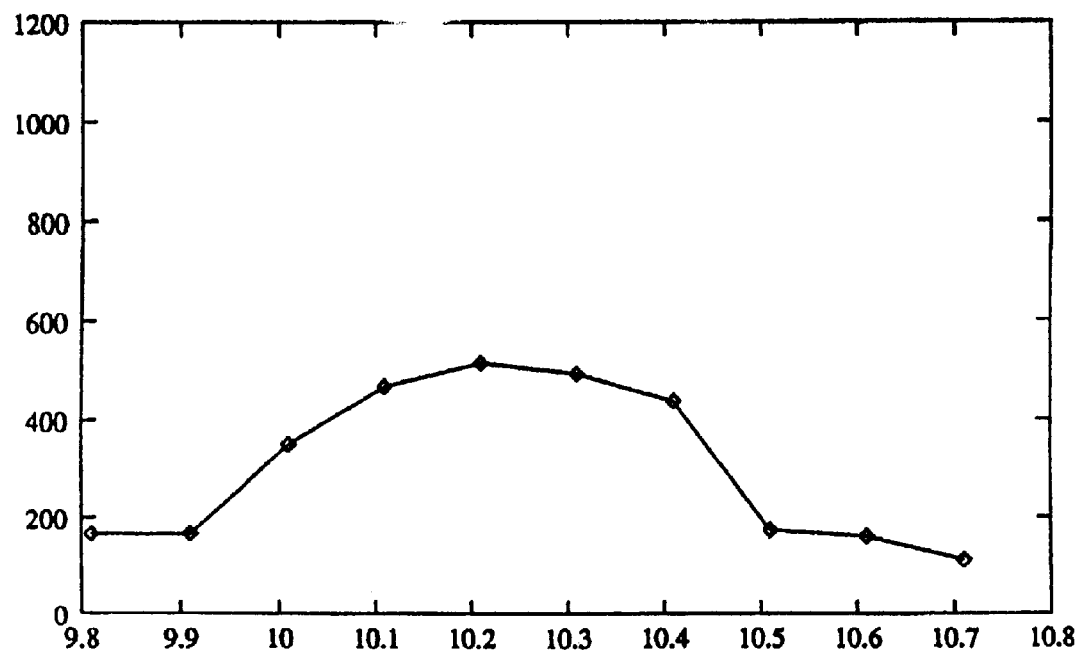
FIG. 4 is a graph showing the results of Vickers hardness test on a surface of the edge bearing portion of the counter plate in accordance with the present invention.

Referring now to FIG. 4, there is shown results of measuring the surface hardness (i.e., Vickers hardness: Hv)

of the counter plate 60 in the direction of an arrow A in FIG. 1 by using a Vickers I hardness tester under the conditions of a load weighting of 100 g at a holding time of 30 seconds. in the figure, a lateral axis represents coordinates along the axis A, while a vertical axis represents the obtained values of Vickers hardness. From the results shown in FIG. 4, the coordinates 10.02–10.41 corresponding to a width of the edge bearing portion 62 take the values of Vickers hardness in the range of about Hv 400 to about Hv 500, especially over Hv 500 in the middle. Preferably, the hardness of the edge bearing portion will be about Hv 800. This hardness provides a sufficient strength to guard against excessive wear due to repeated contact with the cutting blades and rulings.

The laser beam hardening applied in the present embodiment uses a device for carbon dioxide beam machining, which is used to prepare the base plate as described above, under the conditions of: 500 W in output power; 10 inches in a focal length; and 2,400 mm/min. processing rate. Accordingly, the hardening process is easily performed with the aid of CAD data used in the process of forming grooves in the counter plate, resulting in efficient fabrication.

Prior to hardening, cutting and bending for preparing the cutting blade is easily performed because the SK material is not yet hardened. The bending is easily performed without the need for corrective action, such as prevention of spring back.

As a consequence of the process of the present invention, a cutting die can be constructed by machining less expensive, less hard steel plate, instead of machining steel having a high degree of hardness as is usually the case. According to the process of the present invention, only the cutting edges of the blades need be hardened by means of laser irradiation, and only those portions of the counter plate that are contacted by the cutting blades need be hardened, resulting in a more efficient and cost effective means of fabricating a cutting die.

The counter plate, which operates as a receiving surface for the cutting blades and optionally the ruled portions of the cutting die, comprises: a plate body made of a thin steel plate, which constitutes a whole of the counter plate; a plurality of edge bearing portions formed on portions corresponding to the cutting blades by hardening using a laser beam irradiation; and a plurality of hollows formed on portions corresponding to the rulings. The thin steel plate may be made of a SK material. The hollows may be formed by cutting operations. The laser beam irradiation may be performed by carbon dioxide laser.

Therefore, the counter plate of the present invention may be made from a broad variety of materials, and hardened according to the process of the present invention. Preferably, a SK material such as carbon tool steel may be used for obtaining a high hardness (i.e., about HRC 50°) by means of a laser irradiation. Considering of the formation of rust on a surface of the material, it is preferable to subject at least a surface of the material to plating. It is preferable to minimize a thickness of the thin steel plate from the points of cost-effectiveness and easy handling. In the present invention a thickness of the counter plate is in the range of 0.5 mm to 2 mm in consideration of forming the hollows thereon.

In the present invention, hollows may be formed on the counter plate by way of the previously known cutting operations using a milling cutter or the like, or other operations using an etching, an electrochemical machining, or the like. Previously, the hardening was accomplished by heating the material up to a predetermined temperature followed by cooling at a predetermined rate. To simplify the process, a carbon dioxide laser beam machine for forming grooves on a base plate of the cutting die, which correspond to the cutting blades or the like, may be also used in the process for machining the counter plate. In this case, however, a typical laser beam machine may be also applicable.

The biggest advantage of the present invention is to provide a useful counter plate by hardening only portions thereof to be contacted with cutting blades of a cutting die. Furthermore, for the formation of hollows, the hardening process is easily performed with the aid of CAD data used in the process of forming grooves of the base plate to be used for fixing cutting blades or the like, resulting that the machining operations can be down very easily. Accordingly, the counter plate can be provided by the process with less expensive as a consequence of simplified machining and of using a comparatively cheap material.

In the present invention, a necessary condition for the hardening process using a laser beam irradiation is to air cooling after the irradiate on. However, it may be also possible to apply forced cooling for portions with the difficulty of hardening, such as hardening crowded portion or a portion at the intersection of the hardening lines. For a coolant, cooling water, liquid nitrogen, or the like may be sprayed on a f rant or back side of the target portion directly after the laser irradiation. In the case of spraying water on the surface, there is a problem of laser beam absorption. In this case, however, this kind of absorption can be of a negligible amount when the carbon dioxide laser is used because the target portion is well hardened through a water layer with a thickness of several millimeters. This kind of cooling can be effectively applied on a very thin steel plate in a sense of preventing the deformation of the plate, and so on to be caused by the hardening. Furthermore, it is preferable to use nozzle means to be moved in synchronization with a laser beam scanning.

Strictly speaking, in this kind of the hardening by irradiating the laser beam, it is preferable to keep an absorptivity of the laser energy constant on a surface of the plate. If the general steel plate is used as is, the hardness to stand contact with the cutting blade is obtained at the minimum. For keeping the absorptivity of the laser energy constant, it is preferable to form a uniform layer on the surface by means of painting, printing, or the like. For example, it can be also performed by ejecting ink just at the front of a scanning position of the laser beam from an ink jet nozzle. Alternatively, the surface may be polished.

In the present invention, especially in the case of using a thin material, there is a possibility that the material is deformed as a warp or the like to be caused by the hardening using the laser irradiation. The extent of the deformation can be reduced to a certain extent by means of cooling or the like. Alternatively, other types of hardened portion can be formed for canceling the warp of the whole material, for example the method of forming the hardened portion on the backside being opposed to the hardened portion of the surface, or the method of forming two hardened portions on the both sides of the backside being opposed to the hardened portion of the surface.

In the present invention, by the way, the hardening can be performed from the backside using the laser irradiation when it is subjected to a thin steel plate especially of about 1 mm or less in thickness. If the hardening is performed on such material from its surface, for example, a center of the material suffers upward warping so as to make a protuberance on the surface. If the hardening is performed on such material from its backside, on the other hand, a center of the material suffers downward warping so as to make a hollow on the back, resulting in the advantage of making easy to deal with.

The preparation of the cutting die according to the present invention is based on the new idea of hardening only a cutting edge portion of the cutting blade. This is done by selecting a comparatively inexpensive material of relatively low hardness and easy processability; machining the selected material into a predetermined shape and installing it into a base plate; and hardening the cutting edge portion by means of laser beam irradiation.

In the present invention, the required level of quality of the cutting blade may be achieved by hardening using the laser beam irradiation. Therefore, the material of the cutting blade may be a thin steel plate in general. Preferably, a SK material such as carbon tool steel may be used for obtaining a high hardness (i. e., about HRC 50°) by the laser beam hardening. Considering the possible formation of rust on the surface of the material, it is preferable to subject at least the surface thereof to plating. A thickness of the cutting blade may be the same as that of the conventional one, typically of the order of 0.5 mm to 3 mm.

In the present invention, furthermore, the method for forming the cutting edge of the cutting blade is not restricted in narrow limits but it is possible to form the cutting edge by one of the previously known operations such as cutting and forging. in the case of a cutting operation, it is possible to machine a material to be provided as the cutting blade after hardening entirely. In this case, however, the material may be subjected to annealing after machining and then only the cutting edge portion may be hardened by the laser irradiation. When the hardened material is machined without annealing or with slight annealing, it may be acceptable to slightly harden the cutting blade throughout within the scope of the present invention.

The hardening of the cutting edge portion using a laser beam irradiation may be performed by irradiating the laser beam from the tip of the cutting edge to heat it up to the predetermined temperature and then cool it at least at the predetermined rate. To simplify the process, a carbon dioxide laser beam machine may be used to form grooves on the base plate of the cutting die, which correspond to the cutting blades. In this case, however, some typical laser beam machines may be also applicable.

The biggest advantage of the present invention is to provide a cutting die that allows easy processing and installation, in which at least the cutting edge of the cutting blade has a sufficient hardness as a result of hardening only the cutting edge. Furthermore, the hardening process is easily performed with the aid of CAD data used in the process of forming grooves in the base plate for affixing cutting blades. Because the cutting blades and counter plate are subjected to repeated stress which may result in metal deformation, cutting die machines can become inoperable, requiring new cutting blades and a counter plate. Accordingly, the present invention provides a less expensive means of fabrication as a consequence of simplified machining requirements and of less expensive material requirements.

According to the present invention, the cutting blade comprises a base portion which is not subjected to substantial hardening processes, and a cutting edge portion which is hardened. During stamping, the base portion can be elastically deformed in a easy manner to absorb an impactive force to be applied on the cutting edge portion. It means that there is another advantage that a long wearing cutting edge portion can be obtained in accordance with present invention. The laser beam hardening against the cutting blade to be installed in the cutting die of the present invention is performed under the same conditions as that of the counter plate described above.

Consequently, as described above, a cheap cutting die with high durability can be materialized by the process including the steps of using a cheap material to be easily machined and hardening only an edge portion of a cutting blade by means of a laser irradiation to easily form a high hardness cutting blade. The counter plate, or receiving surface of the cutting die, can easily be fabricated using the same process so that only those portions that contact the ruled portions or cutting blades of the cutting die will be hardened.

Although the foregoing invention has been described in some detail by way of illustration and example for purposes of clarity of understanding, it will be obvious that certain changes and modifications may be practiced within the scope of the appended claims. The present invention has been described in detail with respect to preferred embodiments, and changes and modifications may be made without departing from the invention in its broader aspects, and it is the invention, therefore, in the appended claims to cover all such changes and modifications as fall within the true spirit of the invention.

We claim:

1. A method for manufacturing a counter plate to be provided as a receiving substantially planar surface opposed to a cutting die and to be installed in a die-cutting machine for stamping a sheet material into a predetermined shape and making ruled lines thereon by using said cutting die on which cutting blades and rulings are securely fixed, said method comprising the steps of:

forming hollows on portions of a plate body made of a thin steel corresponding to said rulings;

hardening portions of said plate body in order to form edge-bearing portions corresponding to said cutting blades by irradiation with a laser beam so that partial melting occurs, and quenching so that solidification occurs; and annealing the edge-bearing portions by irradiation with a laser beam so that adjusting the hardness thereof.

2. A method for manufacturing a counter plate as claimed in claim 1, wherein the annealing of the edge-bearing portions is performed by irradiation with a laser beam having low-power in average and scanning in low-speed.

3. A method for manufacturing a counter plate to be provided as a receiving substantially planar surface opposed to a cutting die and to be installed in a die-cutting machine for stamping a sheet material into a predetermined shape and making ruled lines thereon by using said cutting die on which cutting blades and rulings are securely fixed, said method comprising the steps of:

forming hollows on portions of a plate body made of a thin steel corresponding to said rulings;

hardening portions of said plate body in order to form edge-bearing portions corresponding to said cutting blades by irradiation with a laser beam so that partial melting occurs, and quenching so that solidification occurs; and performing a corrective action on a deformation of said thin steel plate to be caused by said laser beam irradiation, before or after said laser beam irradiation.

4. A method for manufacturing a counter plate as claimed in claim 1, wherein said laser irradiation and said formation of hollows are performed by using CAD data used in a formation of grooves for fixing said cutting blades and said rulings of said cutting die.

5. A method for manufacturing a counter plate as claimed in claim 1, further comprising the step of:

cooling at least portions irradiated by laser beam after said laser beam irradiation.

6. A method for manufacturing a counter plate as claimed in claim 3, wherein said laser irradiation and said formation of hollows are performed by using CAD data used in a formation of grooves for fixing said cutting blades and said rulings of said cutting die.

7. A method for manufacturing a counter plate as claimed in claim 3, further comprising the step of:

cooling at least portions irradiated by laser beam after said laser beam irradiation.

* * * * *